May 19, 1925. 1,538,801
R. F. HALL
AIRPLANE
Filed Nov. 14, 1922 5 Sheets-Sheet 2
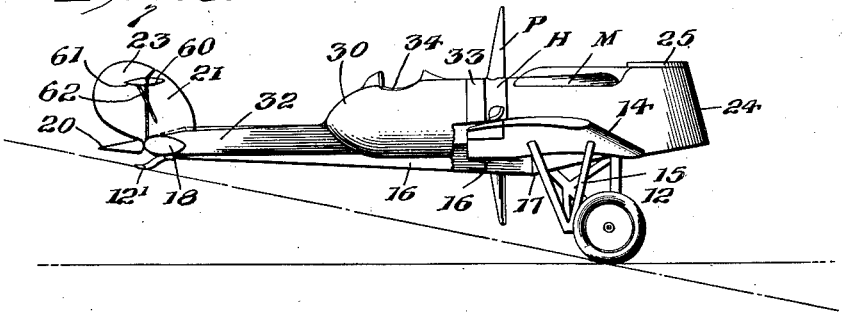
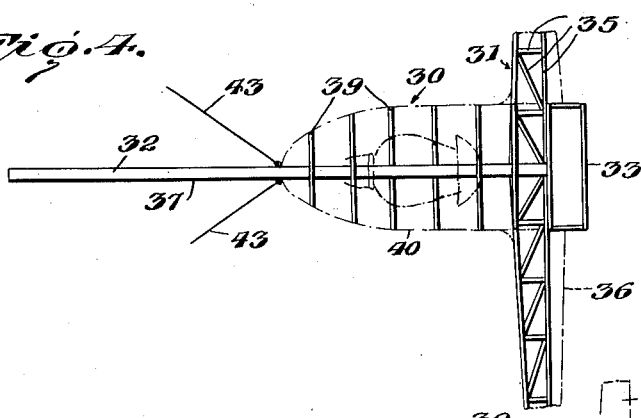
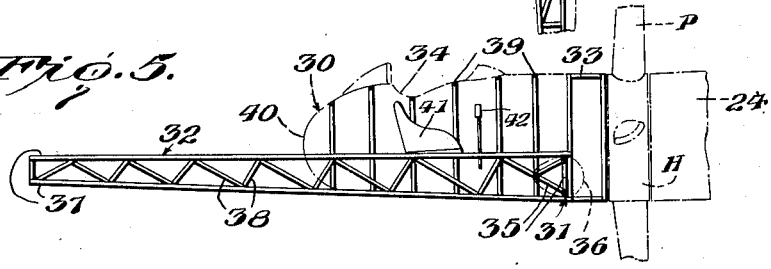
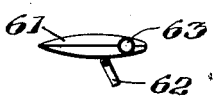
Inventor
Randolph F. Hall,
Witness:
Robert F. Beck.
By
Attorney

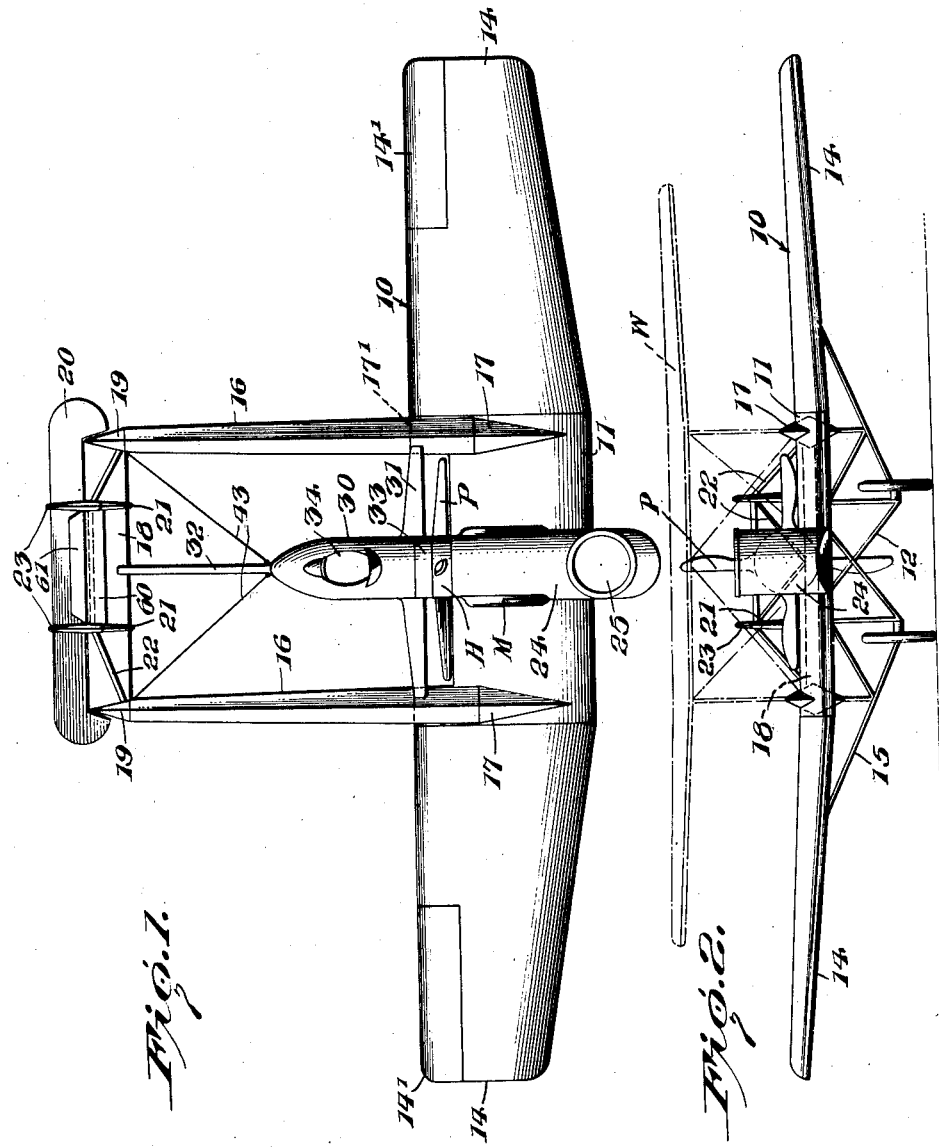

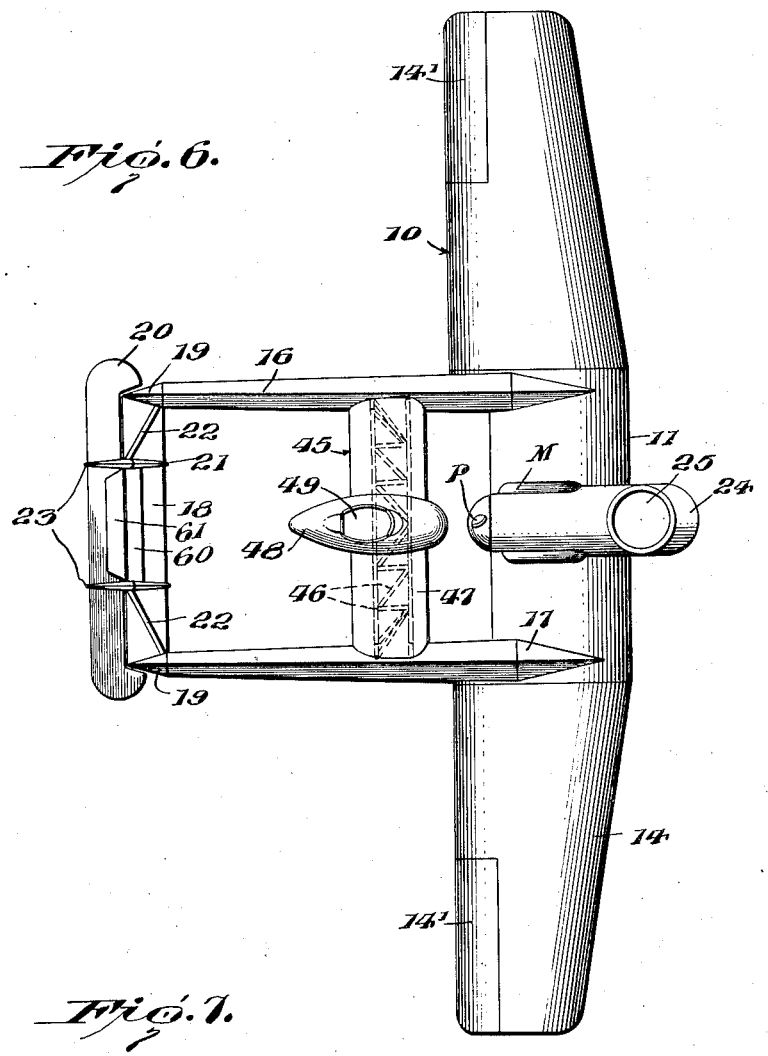
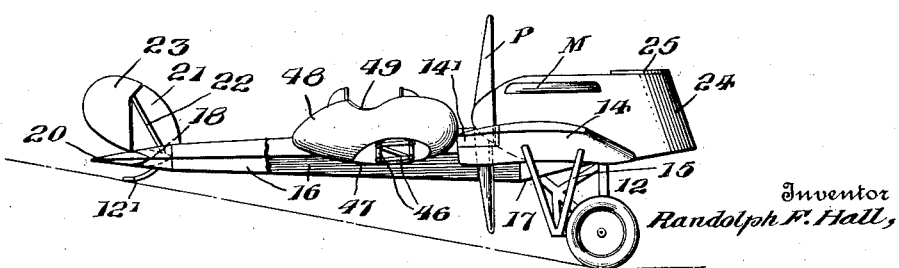

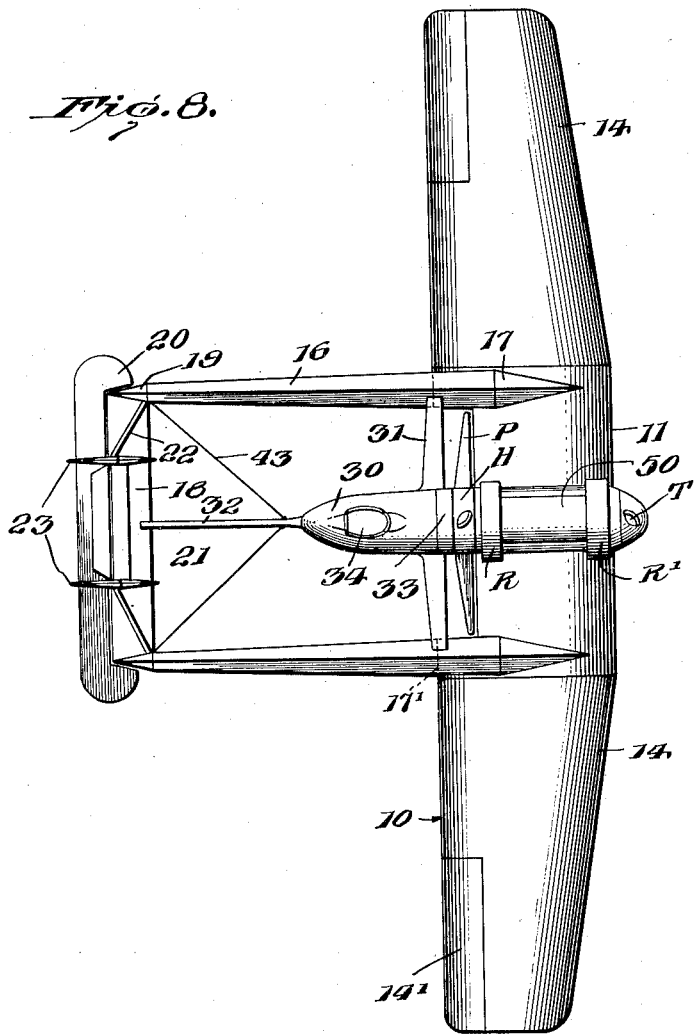
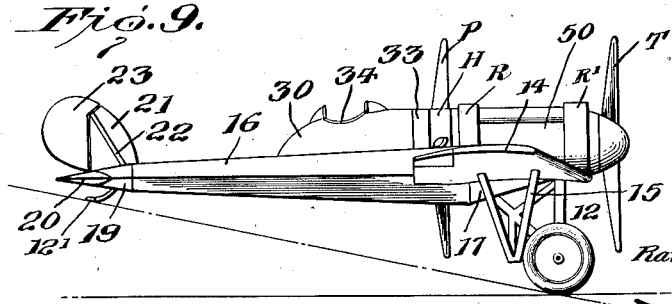

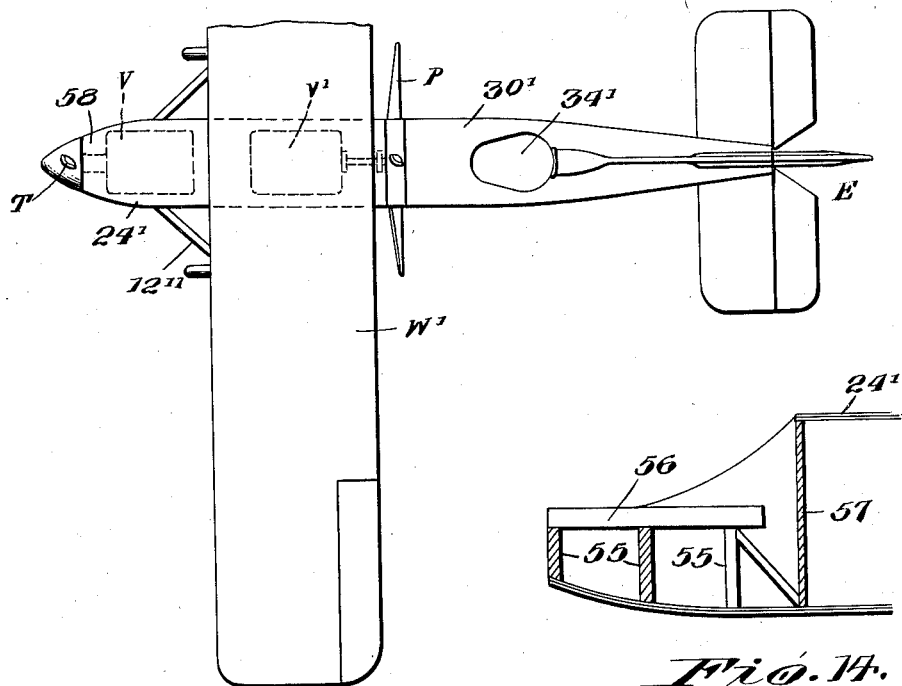
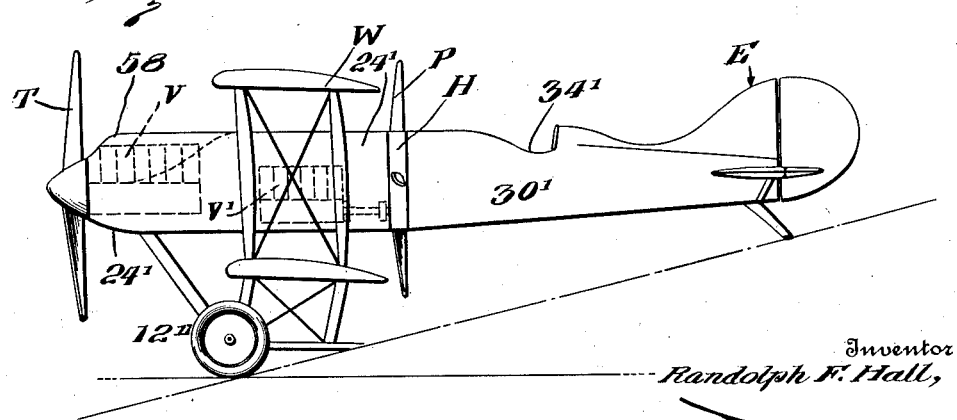

Patented May 19, 1925.

1,538,801

UNITED STATES PATENT OFFICE.

RANDOLPH F. HALL, OF ITHACA, NEW YORK, ASSIGNOR OF ONE-FOURTH TO THEODORE P. HALL, OF WALLINGFORD, CONNECTICUT, AND THREE-SIXTEENTHS TO PAUL WILSON, OF ITHACA, NEW YORK.

AIRPLANE.

Application filed November 14, 1922. Serial No. 600,898.

*To all whom it may concern:*

Be it known that I, RANDOLPH F. HALL, a citizen of the United States of America, and a resident of Ithaca, county of Tompkins, State of New York, have invented certain new and useful Improvements in Airplanes, of which the following is a specification.

This invention relates to certain improvements in airplanes; and the nature and objects of the invention will be readily understood by those skilled in the arts involved in the light of the following explanation and detailed description of the accompanying drawings illustrating what I at present consider to be the preferred embodiments or mechanical expressions of the invention from among various other forms, arrangements, combinations and constructions of which the invention is capable within the spirit and scope thereof.

The invention is primarily directed broadly and is applicable generally to airplanes of the so-called pusher types characterized by a propeller or propellers mounted and operating to the rear or aft of the main supporting surfaces of an airplane, which types will be recognized and familiar to those skilled in this art; and the invention is more particularly directed and applicable to such types which are provided with an outrigged tail structure or empennage, and a main car or nacelle (or nacelles) having a pusher propeller (or propellers) mounted at the rear or after end thereof.

According to the prevailing conventional design practice followed in the foregoing types of airplanes, a pusher propeller is generally located to the rear or aft of a car or nacelle and is driven by a power unit mounted on or within the car or nacelle. In those designs characterized by a single car or nacelle, or by a main control nacelle, such nacelle is usually mounted along the longitudinal or fore and aft center of an airplane, with the forward or nose end thereof so positioned with respect to the main supporting surface or surfaces as to obtain the least obstructed view therefrom which the design and arrangement of the airplane permits. Hence, in order to secure as large a range of vision for a pilot as possible, the pilots or control cockpit is formed at the forward or nose end of a nacelle, from which cockpit an airplane is controlled, with the power unit for driving a pusher propeller mounted on or in the nacelle to the rear or aft of such cockpit. The power unit is also preferably mounted on or in the rear or after end of a nacelle to reduce the distance between the pusher propeller and the power unit, and hence reduce the extent of the operating connections required between the power unit and the propeller.

With this conventional design of control nacelle and power unit mounting, the pilot is located in the control cockpit at the nose or forward end of the nacelle with the power unit mounted in the nacelle to the rear of the cockpit. In the event of a crash or of the airplane "nosing over," the pilot is unprotected from the power unit mounted to the rear of the control cockpit, which power unit will be thrown forward, as well as unprotected at the nose or forward end and sides of the nacelle. Further, with the control cockpit located at the forward or nose end of a nacelle, the distance therefrom to the control surfaces of the empennage and to the wing mounted control surfaces reaches a maximum, as well as separating the cockpit from such control surfaces with a maximum of intervening structure, with the result that the operating mechanism and the installation and mounting thereof between the control cockpit and the control surfaces is materially complicated. These disadvantages are particularly encountered and present in those pusher types having an outrigged tail structure or empennage, although likewise present in pusher types having a body or car of the fuselage type, provided with a pusher propeller mounted thereon.

Therefore, one of the main objects of the present invention is the practical elimination of the referred to dangers to a pilot attendant the location of a control cockpit at the forward or nose end of a car or nacelle; and the substantial reduction in the extent of operating mechanism required between a control cockpit and the control surfaces, as well as to simplify such control mechanism and the installation and mounting thereof.

A further object of the invention is to provide an airplane of the pusher type having a main car or nacelle at the rear or after end of which a pusher propeller is driven by a power unit mounted on or in the nacelle, with an independent pilot's car or nacelle detachably mounted on the airplane to the rear of and substantially in longitudinal or fore and aft alinement with the main nacelle, so that the pilot's nacelle is in effect protected by the forward main nacelle as well as from the power unit which is located forward of the pilot's nacelle.

A further object of the invention is to provide an airplane of the pusher type having an outrigged tail structure or empennage and a car or nacelle at the rear or after end of which a pusher propeller is mounted, with an independent pilot's nacelle, from which the airplane is controlled, detachably supported from the outrigged structure to the rear of and longitudinally alined with the main nacelle, so that the pusher propeller is located between the main nacelle, and the independent pilot's nacelle, with the latter forming a rearward extension and continuation of and rearwardly carrying out the streamline shape and contour of the main nacelle to obtain a minimum of slip stream interference by the car and to reduce parasite or head resistance to a minimum.

A further object of the invention is to increase the performance generally of airplanes of the multiple motor or multiple propeller driven types, and to reduce the inertia inherent in prevailing designs of such types in order to obtain a greater maneuverability therefor.

A further object of the invention is the provision of an airplane of the multiple motor or multiple propeller driven type, in which pusher and tractor propellers are located at the after and nose ends, respectively, of a car or nacelle in alinement longitudinally of and along the fore and aft center of the airplane; and to further provide a pilot's or control nacelle independent of and forming a longitudinal continuation and extension of the motor and propeller nacelle, so that by such design, arrangement and mounting a multiple motor or multiple propeller driven airplane is formed which presents a minimum of head and parasite resistance from cars or nacelles and which attains a higher performance and increased maneuverability for an airplane of such type.

A further object of the invention is to overcome the difficulties encountered in varying or adjusting the main horizontal stabilizer surfaces in empennages of the multiple vertical fin and rudder types, and particularly in such empennage types when mounted or supported on outrigger structures, by the provision of a design and arrangement of such types of empennages through the medium of which the longitudinal balance of an airplane can be readily varied and adjusted from the pilot's or control cockpit in flight.

A further object of the invention is to provide certain novel features in construction and mounting of independent pilot's or control nacelles embodying the invention, and particularly in the mounting of such nacelles on airplanes of the outrigged empennage types; and a further object of the invention is the improvement of the construction of empennage supporting outriggers and the construction and mounting of an empennage thereon and thereto.

With the foregoing and various other objects in view, which other objects will be readily recognized by those familiar with and skilled in the aeronautical art, the invention consists in certain novel features in construction and arrangement of elements and in certain novel combinations, as will be more fully and particularly pointed out and referred to hereinafter.

Referring to the accompanying drawings:

Fig. 1, is top plan of a pusher monoplane of the outrigged empennage type having one form of pilot's nacelle embodying the invention mounted in position thereon.

Fig. 2, is a front elevation showing in dotted outline a possible mounting of an upper wing to form a multiplane type with a nacelle of the invention incorporated therein and applied thereto.

Fig. 3, is a side elevation with one of the outrigger girders removed to show the mounting of the independent pilot's nacelle and the support girders therefor; and disclosing more or less diagrammatically the empennage and one form of adjustable stabilizer of the invention mounted in position thereon.

Fig. 4, is a diagrammatical view in top plan of one construction of the form of independent pilot's nacelle and supporting girders therefor shown in Fig. 1.

Fig. 5, is a diagrammatical view in side elevation with parts thereof in vertical section of a construction and mounting of the form of nacelle of Fig. 1, the pusher propeller of the main nacelle being shown in dotted outline.

Fig. 6, is a top plan view of a modified form and mounting of a pilot's nacelle embodying the invention mounted on a pusher airplane having an outrigged empennage.

Fig. 7, is a view in side elevation of the design and arrangement of Fig. 6, a portion of one of the outrigger girders and skin of the independent nacelle being broken away to show the mounting and construction of the nacelle support girder.

Fig. 8, is a top plan view of the monoplane of Fig. 1 provided with the independent pilot's nacelle mounted thereon, and showing the arrangement and mounting of a pusher and tractor propellers mounted on the main centrally mounted nacelle in accordance with the invention.

Fig. 9, is a side elevation of the design and arrangement shown in Fig. 8.

Fig. 10, is a diagrammatic view in end elevation of the adjustable stabilizer and mounting therefor of the invention.

Fig. 11, is a diagrammatic view in end elevation of a modified form of adjustable stabilizer and mounting therefor.

Fig. 12, is a top plan, more or less diagrammatic, of an arrangement and mounting of a tractor and pusher propellers embodying the invention applied to a form of forward car and rear pilot's control car providing a body of the fuselage type.

Fig. 13, is a view, more or less diagrammatic, of the design and arrangement of Fig. 12.

Fig. 14, is a view, more or less diagrammatic, of the nose end of the forward car of Figs. 12 and 13, showing a monocoque construction with one manner of mounting and supporting a motor therein.

In the accompanying drawings certain mechanical adaptations and physical embodiments of the various features of the invention are disclosed purely by way of example for purposes of illustration and explanation of the principles of the invention. The illustrated types and designs of airplanes are selected and shown because the problems solved and the conditions overcome by the invention are inherent and encountered in these designs in an accentuated degree, and hence they serve to more clearly and sharply bring out the results and advantages attained by the various features of the invention. To those skilled in this art it will be readily apparent that the various features of the invention and principles involved are applicable generally to various other designs and arrangements of airplanes, of both land and water types, in which similar conditions are encountered and where it is desired to attain the results and advantages attendant the use of the invention, and that the mechanical and physical adaptations and embodiments of the features of the invention will necessarily take other forms and constructions than in the illustrated applications. Therefore, it is not desired to limit the invention to application on and in the airplane designs disclosed herein, or to the specific embodiments and forms which the various features have taken in the illustrated applications, in view of the clearly apparent general applications and embodiments of which the various features of the invention are capable.

In Figs. 1 to 9 of the accompanying drawings, a pusher monoplane of the type having an outrigged tail structure or empennage is illustrated as embodying certain features of the present invention. The referred to design comprises a monoplane wing 10 of the internally braced cantilever or semi-cantilever type formed of a center panel or section 11 mounted and supported on a landing carriage or chassis 12, and the outer panels 14 attached to the opposite ends, respectively, of the center panel 11 and braced by suitable struts or bracing 15 from the chassis 12. In the illustrated design the center panel 11 is of smaller chord than the inner attached ends of the outer panels 14 and an empennage supporting outrigger is attached to and supported from the center panel.

The outrigger structure comprises the spaced outrigger girders 16 of substantially diamond shape in cross section, which are preferably detachably secured and mounted at the inner or forward ends thereof to the trusses 17 built-in to the center panel 11 at opposite ends thereof respectively, and providing forwardly extending continuations of the girders 16. In attached mounted position the girders 16 are supported from the center panel and extend rearwardly therefrom, and are so formed and constructed, preferably of a built-up truss structure covered by any suitable skin to provide a hollow shell-like girder, as to have sufficient depth and width to transmit all the vertical and horizontally acting empennage loads and stresses to the wing trussing and bracing for equal distribution thereto without requiring exterior resistance forming bracing for the girders. A suitable tail assembly or empennage is mounted on and supported at the rear extended ends of the outrigger girders 16, and comprises a main horizontal stabilizer 18 mounted across and closing the rear ends of the outrigger girders 16, by means of the built-in trusses 19 forming the opposite ends of the stabilizer 18 and alined in mounted position thereof with the outrigger girders 16 to which they are preferably detachably attached. An elevator 20 is pivotally mounted on and to the trailing edge of the horizontal stabilizer 18. A pair of spaced fins 21, forming vertical stabilizer surfaces, are mounted on and secured to the stabilizer 18 intermediate the points of attachment of the stabilizer 18 to the outrigger girders 16. Suitable braces or streamline struts 22 are provided extending between the stabilizer 18 and the vertical fins 21. A vertical balanced rudder 23 is pivotally mounted on the trailing edge of each vertical fin 21 to provide a set of twin rudders for directional control of the airplane. Thus, the empennage or tail assembly so constructed and arranged is mounted on, rigidly attached to and supported at the rear ends of the outrigger girders 16, which girders are so constructed and mounted on the center wing panel 11, as to be supported from the wing and transmit all empennage and other loads and stresses imposed thereon, to the wing structure.

The design disclosed in Figs. 1 to 3 is provided with a main car or nacelle 24 mounted and supported on the center panel 11 along the longitudinal or fore and aft center of the airplane, with the forward or nose end of the nacelle extended forwardly a distance from the leading edge of the wing 10 and having a suitable cockpit arrangement 25 formed therein. The rear or after end of the nacelle 24 terminates approximately at the trailing edge of the center panel 11 and a pusher propeller P is mounted thereon with working clearance between the center section trailing edge and the opposite empennage outrigger girders 16. A suitable power unit, such as the motor M is mounted within the rear end of the nacelle 24 and is operatively connected to the propeller P for driving the same, as will be understood and familiar to those skilled in this art. In the prevailing conventional designs typifying broadly the foregoing type of main central nacelle having a pusher propeller mounted at the after end thereof and an outrigged empennage, the pilot's or control cockpit is formed in the nose end of the fuselage forward of the power unit, as for example the cockpit 25, and this arrangement of nacelle and location of the control cockpit presents certain disadvantages heretofore pointed out and explained.

The invention provides a supplemental car or nacelle mounted to the rear or aft of the main nacelle and having a pilot's or control cockpit arranged therein. In Figs. 1 to 5, one form, embodiment and mounting of which this feature of the invention is capable is disclosed as comprising the supplemental car or nacelle 30 mounted and supported to the rear or aft of the main nacelle 24 and pusher propeller P in longitudinal or fore and aft alinement with the nacelle 24 to form a rearward extension and continuation thereof, carrying out the streamline shape and contour of the main nacelle. The control nacelle 30 is supported in mounted position with its forward end spaced a distance rearwardly from the propeller P, on and by the transverse streamline girder 31 extending between the outrigger girders 16 a distance rearwardly and spaced from the propeller P, and by the longitudinal girder 32 extending from the transverse girder 31 rearwardly between the outrigger girders 16 along the fore and aft center of the airplane to the horizontal stabilizer 18 of the empennage. The hub H of the pusher propeller P is faired with and carries out the contour of the main nacelle 24, and the space between the propeller P and hub thereof and the forward end of the supplemental nacelle 24 is faired with the forward main nacelle 24 and the rear supplemental nacelle 30 by means of a removable section 33 which carries out the contour and form of the alined forward and after nacelles. The removable section 33 is so mounted and positioned as to provide proper working clearance for the propeller P and the hub H thereof. Any suitable or desired pilot's or control cockpit arrangement 34 is formed in the supplemental nacelle 30, from which cockpit the airplane is controlled.

One construction and mounting of the nacelle 30 and transverse and longitudinal support girders 31 and 32 therefor, is diagrammatically illustrated in Figs. 4 and 5 of the accompanying drawings. In the illustrated example the transverse girder 31 is formed of triangular truss construction 35 covered and housed within any suitable skin or shell 36 to provide a streamline girder of minimum parasite resistance. The girder 31, so formed, is mounted to the rear of the propeller P between the outrigger girders 16, with the opposite ends of the girder trussing 35 extending into the adjacent outrigger girders 16, respectively, and detachably secured, in any of a number of ways well known and understood by those skilled in this art, to the trussing and bracing of the girders 16. The streamline skin or shell 36 of the girder 31 is formed to merge with and join the skin or covering or skin of the girders 16 so as to avoid as much as possible any openings or space therebetween, as will be readily apparent and understood by reference to the drawings. The longitudinal or fore and aft girder 32 is formed as a truss having the upper and lower spaced beams 37 and the interbracing 38 suitably covered and enclosed in a skin or shell. The girder 32 is attached and secured at the forward end to and extending centrally and transversely through and of the transverse girder 31, and at the rear or after end is detachably mounted and secured to the horizontal stabilizer 18.

The pilot's or control nacelle 30, in the present instance, is formed on and preferably detachably secured and attached to the support girders 32 and 31, in proper position aft of and alined with the main car or nacelle 24. A series of substantially circular ribs or contour formers 39 are secured to the lower beam 37 of the longitudinal girder 32, spaced rearwardly therealong from the transverse girder 31, and extending laterally from opposite sides of, and upwardly above and across the longitudinal girder 32. The contour formers 39 are of varying diameter to give the required shape to the nacelle 30 to form the proper rearward continuation of the streamline contour of the main nacelle 24. A suitable covering or skin 40, shown in dotted outline in Figs. 4 and 5, is secured and attached over and covering the contour formers 39 and the portion of the longitudinal girder 32 therebelow, to form the completed control nacelle 30 as a rearward continuation of the exterior contour of the main nacelle 24. The skin or covering 40 is arranged at the forward end of the nacelle 30 to merge into and join the streamline shell of the transverse girder 31, and at the rear or after end of the nacelle the skin 40 is arranged to merge gradually into and join the shell or skin of the longitudinal girder 32. The nacelle 30, so formed, is provided with a pilot's or control cockpit 34 in which a seat 41 is suitably arranged and proper control means, indicated by the control stick 42, mounted for operation from the seat 41, in any of a number of ways well known and understood by those skilled in this art (see Figs. 4 and 5). If desired or deemed necessary the control nacelle support girders can be additionally braced by suitable brace wires 43 secured between the longitudinal girder 32 adjacent the after end of the control nacelle 30, and the after or rear ends of the outrigger support girders 16, as clearly shown in the accompanying drawings. The removable section 33 can be formed of any suitable or desired frame covered by a shell or skin to provide the required contour to fair with and carry out the streamline form of the alined forward and rear nacelles 24 and 30, respectively. The streamline shell or skin 36 of the transverse girder 31 is preferably cut away and receives the removable section 33 in mounted position, which section 33 can be removably attached and secured to the transverse girder trussing, or secured in any other desired manner, to permit of its ready removal and replacement from and to mounted position, for a purpose referred to and explained hereinafter.

From the foregoing it is seen that a supplemental pilot's or control nacelle 30 is provided which is mounted between and supported from the outrigger girders 16 to the rear or aft of the pusher propeller P, independently of and in fore and aft alinement with the main nacelle 24, and with the pusher propeller P between the nacelles so alined. With the nacelle 30 so mounted and formed with the cockpit 34 from which the airplane is controlled, a pilot is protected by the surrounding structure, wings, outrigger girders and empennage, as well as protected from the motor M mounted forwardly thereof, which motor in the event of a crash is usually thrown or falls forwardly toward the cockpit 25 at the nose end of the main nacelle. The control nacelle mounted in alinement with and carrying out the streamline contour of the main nacelle, together with the propeller hub H and removable section 33 faired with the alined nacelles, provides a design of minimum slip-stream interference to the propeller P, as well as offering low head or parasite resistance. The pilot's or control nacelle 30 is preferably detachably mounted on the support girders 32 and 31, and the girders are detachably mounted on and secured to the outrigger girders 16 and the stabilizer 18, so that the nacelle 30, can be removed from the support girders, or the nacelle and support girders therefor can be removed as a unit. By providing a large parachute suitably housed in and attached to the control nacelle 30, it is possible for a pilot to detach the nacelle and release the parachute for descent in the nacelle from the airplane. The design and mounted position of the transverse nacelle support girder 31 is such that the propeller P is readily accessible for cranking the motor M, while the removable section 33 allows for the removal and replacement of the propeller P.

With the nacelle 30 mounted in position to the rear of the main nacelle, the distances and intervening structure between the control cockpit 34 and the empennage control surfaces and the wing mounted control surfaces or ailerons 14', are materially and substantially reduced, so that the use of more simple, and direct control operating mechanism is possible than with a control cockpit as 25 located at the forward or nose end of the main nacelle. Any of the well known arrangements and mountings of control surface operating mechanism (not shown), such for example as the push and pull tube type, can be employed between the elevator 20, rudders 23, and the wing ailerons 14'. The possible addition of an upper wing W to the monoplane design of Figs. 1 and 9, to form an airplane of the multiplane type, is indicated in dotted outline in Fig. 2, as showing that the various features of the invention are equally applicable to airplanes of the multiplane types as to those of the monoplane type.

A modified form and mounting of pilot's or control nacelle is disclosed in Figs. 6 and 7 of the accompanying drawings, as applied to and embodied in the pusher monoplane design of Figs. 1 to 3 described hereinbefore. In this modified embodiment, a lift surface 45 of aerofoil section is mounted across and between the outrigger girders 16, a distance rearwardly from the main nacelle 24 and pusher propeller P, and detachably secured to the outrigger girders. The lift surface 45, in the example illustrated, is formed of a truss 46, rectangular in cross section and detachably secured at its opposite ends to the trussing of the girders 16, respectively, and a covering or shell 47 mounted over and enclosing the truss 46. The shell 47 is extended forwardly and rearwardly from the truss 46 between the outrigger girders 16, and is shaped to form a lift surface having an aerofoil section, as clearly shown in Fig. 7 of the accompanying drawings. A pilot's or control nacelle 48 of monocoque construction, although not so limited, is mounted and supported on said lift surface 45 and the truss 46 thereof, along the longitudinal or fore and aft center of the airplane, in alinement with the main nacelle 24, and terminating at its nose or forward end spaced a distance rearwardly from the main nacelle 24 and pusher propeller P. The pilot's nacelle 48, so mounted is provided with a suitable pilot's or control cockpit 49 from which the airplane is controlled through the medium of control surface operating mechanism, as hereinbefore referred to and explained. The nacelle 48 is formed of the proper streamline contour to attain minimum slipstream interference and parasite resistance, and is preferably detachably mounted on the truss 46 and shell 47 forming the supporting lift surface therefor, with the lift surface extending through the nacelle. The lift surface 45 mounted in position within and acted upon by the slipstream from the pusher propeller P results in additional lift effect tending to offset and equalize the resistance and weight offered by the pilot's or control nacelle. The detachable mounting of the nacelle 48 to the supporting truss 46, and of the truss 46 to the outrigger girders 16, permits of their removal from mounted position in the manner and for the purposes pointed out and explained with reference to the embodiment of Figs. 1 to 3.

The invention includes certain features embodying the provision of a bimotored, or multiple motored, design having pusher and tractor propellers mounted and arranged in a novel manner and relation to secure certain advantages in multiple motored or multiple propeller driven types. In Figs. 8 and 9, the principles of this feature of the invention are incorporated and embodied in the airplane design of Figs. 1 to 3, including the pilot's or control nacelle mounting and arrangement feature of the invention. In the example illustrated in Figs. 8 and 9, a main nacelle 50 is mounted centrally on the center panel 11 of the monoplane wing 10 along the fore and aft center of the airplane. A motor R, preferably of the radial type, is mounted at the rear or after end of the main nacelle 50 and drives the pusher propeller P of the type hereinbefore described. A pilot's or control nacelle 30 of the invetnion, of the type disclosed in Figs. 1 to 3, is mounted aft and in rearward continuation of the forward main nacelle 50, in accordance with such feature of the invention as described. At the forward or nose end of the main nacelle a motor R', preferably of the radial type, is mounted and drives the tractor propeller T. Thus, the pusher and tractor motors R and R' and the pusher propeller P and tractor propeller T, respectively driven thereby, are in substantial alinement along the longitudinal or fore and aft center of the airplane with the propeller thrusts applied along the fore and aft center. By this mounting and arrangement, a multiple motored or multiple propeller driven airplane is provided in which pusher and tractor propellers are operated in alinement, and in the case of the bimotored embodiment illustrated, a pusher and tractor propeller are mounted and apply their thrust along the longitudinal or fore and aft center of the airplane. Thus, a multiple motor or multiple propeller driven airplane results, in which the inertia is low with an increase in maneuverability, as well as a general increase in performance for such type of airplane. If desired cargo space can be provided in the main nacelle 50 between the motors R and R', which motors in the case of radial types as diagrammatically illustrated in Figs. 8 and 9 are very compact and permit of the utilization of the major portion of the main nacelle for other purposes than motor installation. With the pilot's or control nacelle 30 of the invention it is possible to remove the control cockpit from the main nacelle for location at a point removed from the motors R and R', and propellers P and T driven thereby, thus eliminating dangers to the pilot while increasing the pilot's vision, as well as increasing the available useful nacelle space of the airplane.

The nacelle and pusher and tractor propeller mounting features of the invention are diagrammatically illustrated in Figs. 12 to 14, of the accompanying drawings, as applied to and embodied in an airplane of the fuselage type. In this embodiment of the invention a main forward nacelle 24' is mounted and supported on a biplane wing structure W' and chassis or undercarriage 12", in the usual manner familiar to those skilled in this art, and a motor V is mounted in the nose end of the car or nacelle 24' operatively connected with and driving a tractor propeller T. A motor V' is mounted at the after end of the main nacelle 24' and drives the pusher propeller P having the hub H thereof faired with the nacelle, in the same manner as hereinbefore described with reference to the embodiment of Figs. 1 to 3. Suitably attached and secured to the main nacelle 24' so as to provide working clearance for and permit operation of the propeller P, is a pilot's or control car or nacelle 30' extending rearwardly from the main nacelle in alinement therewith and forming a rearward extension carrying out the streamline shape and contour thereof. The control nacelle 30', so mounted on and extending from the main nacelle 24', forms a body of the fuselage type having the usual or any other desired empennage E mounted in position on the tail end thereof (rear end of the control nacelle 30'). A pilot's or control cockpit 34' is provided in the control car or nacelle 30', in the same relative position therein as described with respect to the embodiment of Figs 1 to 3, and from which the airplane is controlled.

One manner of mounting the forward motor V in the main car or nacelle 24', is diagrammatically illustrated in Fig. 14, where the forward and rear nacelles 24' and 30' are formed of monocoque construction. The nose end of the main nacelle 24' is left open on the upper side thereof and suitable transverse braces or bulkheads are mounted and braced in the nacelle, and the longitudinal engine bearers 56 are mounted over the braces 55 and upon which the motor V is supported and secured. A bulkhead 57 is provided in the nacelle 24' aft of the open nose end thereof, and any suitable cover or cowling may be provided to close the nose end of the nacelle as indicated at 58 in Figs. 12 and 13.

The embodiment of Figs. 12 to 14, thus incorporates the rear pilot's or control nacelle alined with a forward nacelle to provide this feature of the invention in a body of the fuselage type; and further includes and presents the multiple propeller driven arrangement of the invention in which a pusher and tractor propeller are alined along the fore and aft center of the airplane. The various advantages and results from the use of the foregoing features of the invention, as fully described and explained with reference to the other embodiments thereof disclosed herein, are likewise obtained in the embodiments thereof disclosed in Figs. 12 to 14.

With empennages of the twin or multiple fin and rudder type supported on and secured to an outrigger such as disclosed in the accompanying drawings, the main horizontal stabilizer 18 is secured to and across the outrigger girders 16 and it is exceedingly difficult to so mount such a stabilizer as to be readily adjustable in flight. Particularly is this true in the design of stabilizer and mounting thereof of the present invention, where a stabilizer of thick section is employed secured across and closing the ends of the built-up outrigger girders 16. Therefore, the present invention includes as a feature thereof, the provision of an auxiliary or supplemental adjustable stabilizer of novel form and mounting by means of which the longitudinal balance of an airplane can be readily adjusted by a pilot in flight. Referring particularly to Figs. 1, 3 and 10 of the accompanying drawings, it is seen that this feature of the invention provides a fixed stabilizer surface 60 secured horizontally between the vertical fins 21 and forming a bracing and tie member therefor, and the adjustable stabilizer 61 pivotally secured thereto and extending rearwardly from the trailing edge thereof. Suitable operating means, such as a lever 62, is provided for operative connection to any desired operating mechanism (not shown) extending to the control cockpit and by means of which the pivoted stabilizer surface 61 can be adjusted in flight to correct the longitudinal balance of an airplane, as will be readily understood by those skilled in the art.

In Fig. 11, a modified embodiment of the adjustable stabilizer features of the invention is shown, in which a tie rod 63 is fixed horizontally between and bracing the vertical fins 21 and upon which the adjustable stabilizer surface 61 is rotatably mounted. It will be clear to those familiar with the aeronautical art that, while the foregoing adjustable stabilizer design and mounting is of particular utility in the illustrated type of outrigged empennage to overcome the difficulties in forming the main horizontal stabilizer adjustable when mounted across and secured to the ends of the outrigger girders in accordance with the invention, the adjustable stabilizer design and mounting is also adapted and applicable generally to empennages of the multiple fin or vertical stabilizer type.

Attention is directed to the fact that in the design, construction and mounting of the empennage support girders 16 of the illustrated type, the built-in trusses or girders 17 of and forming a composite part of the wing structure may be extended rearwardly to and terminating along the dotted lines 17' (see particularly Fig. 1 of the drawings) in which event the transverse nacelle support girder 31 would be either detachably mounted on and secured to the built-in wing trusses 17 forming part of the wing, or detachably secured at points rearwardly from the positions shown to the outrigger girders 16.

In the embodiments of the invention illustrated in Figs. 1 to 9 as applied to the design providing the outrigger girders 16 having an empennage assembly, in the case of the land type illustrated a central tail skid 12' is provided. This tail skid is, preferably mounted on the rear or after end of the longitudinal control nacelle support girder 32 along the fore and aft center of the airplane. By this position and mounting of the tail skid 12' an airplane of this design is more readily maneuverable on the ground and the strains and stresses to which subjected are transmitted to the girder 32 and evenly distributed to the main structure of the airplane.

If desired the various forms and types of rear nacelles may be provided with cockpit space for additional occupants, such for example as cockpit space for observers or gunners in military types, and for passengers or crew in commercial types.

It will be clear from the foregoing description and explanation of the accompanying drawings illustrating examples of mechanical adaptations of the various features of the invention, that certain advantages and results are obtained thereby, and that the various features of the invention in design, construction and arrangement are applicable generally to other types, both land and water as well as multiplane types, where it is desired to secure the advantages and results, or the equivalent thereof, accruing from the various features of the invention.

It is also evident that various changes, variations, substitutions and modifications in arrangements, constructions and in details might be resorted to without departing from the spirit and scope of the invention and hence I do not desire to limit myself to the exact disclosures hereof.

Desiring to protect my invention in the broadest manner legally possible, what I claim is:

1. In an airplane including a main nacelle having a pusher propeller mounted at the after end thereof and a rearwardly extending outrigger, a supplemental nacelle detachably mounted and supported from said outrigger independently of said main nacelle to the rear thereof in longitudinal alinement therewith and forming a continuation of the contour of said main nacelle.

2. In an airplane including a main nacelle mounted along the fore and aft center of the airplane and having a pusher propeller mounted at the after end thereof an outrigger structure extending rearwardly of the main nacelle, a supplemental nacelle detachably mounted and supported from said outrigger independently of said main nacelle to the rear thereof in longitudinal alinement therewith and forming a substantially uninterrupted rearward continuation of and carrying out the streamline contour of the said main nacelle.

3. In an airplane including a main nacelle and a rearwardly extending outrigger, a supplemental nacelle mounted and supported from said outrigger independently of said main nacelle in longitudinal alinement therewith.

4. In an airplane including a nacelle having a propeller mounted at the after end thereof and an outrigger extending rearwardly of said nacelle, a supplemental nacelle detachably mounted and supported from said outrigger independently of said propeller nacelle to the rear thereof in longitudinal alinement therewith to form a substantially uninterrupted rearward continuation carrying out the streamline contour of said propeller nacelle, and said propeller formed with a hub portion faired with said alined nacelles so mounted.

5. In an airplane including an outrigger, a forward nacelle, a rear nacelle supported from said outrigger in longitudinal alinement with and carrying out the streamline contour of said forward nacelle, and a removable section mounted between and faired with said forward and rear nacelles.

6. In an airplane, a forward nacelle having a propeller mounted at the after end thereof with the hub portion of said propeller faired with said nacelle, a rear nacelle mounted and supported independently of and in longitudinal alinement with and carrying out the streamline contour of said forward nacelle, and a removable section mounted between and faired with said forward and rear nacelles.

7. In an airplane including a rearwardly extending outrigger, in combination, a power nacelle, and a control nacelle detachably mounted and supported from said outrigger independently of said power nacelle, to rear thereof in longitudinal alinement therewith.

8. In an airplane having an outrigged empennage, a forward nacelle mounted along the fore and aft center of the airplane and having a propeller mounted at the after end thereof driven from a power unit mounted within the nacelle, and a rear nacelle mounted in longitudinal alinement with said forward nacelle and providing a control cockpit from which the airplane outrigged empennage is controlled.

9. In an airplane having an outrigged empennage, a forward nacelle mounted along the fore and aft center of the airplane and having a propeller mounted at the after end thereof driven from a power unit mounted within the rear end of said nacelle, a rear nacelle mounted and supported independently of said forward nacelle in longitudinal alinement therewith and forming a substantially unbroken continuation carrying out the stream line contour of said forward nacelle, and a pilot's cockpit formed in said rear nacelle from which the airplane empennage is controlled.

10. In an airplane, a forward nacelle having a propeller mounted at the after end thereof driven from a power unit mounted in the rear of the nacelle, an outrigger extending rearwardly of said nacelle and a pilot's nacelle detachably mounted from said outrigger to the rear of said forward nacelle in substantially longitudinal alinement therewith, the said pilot's nacelle provided with a control cockpit from which the airplane is controlled.

11. In an airplane, rearwardly extending outrigger girders, an empennage mounted and supported thereon and a nacelle mounted on and supported by said outrigger girders.

12. In an airplane, an outrigger structure including spaced outrigger girders, and a nacelle detachably mounted between and supported by said outrigger girders.

13. In an airplane, an outrigger structure including spaced outrigger girders, an empennage on said outrigger structure support girders extending between and attached to said outrigger girders, and a nacelle mounted on said support girders between said spaced outrigger girders.

14. In an airplane, a main nacelle, an outrigger structure extending rearwardly from the airplane, and a supplemental nacelle mounted and supported from said outrigger structure to the rear of and in substantially longitudinal alinement with said main nacelle, said supplemental nacelle protected by said main nacelle and outrigger structure.

15. In an airplane, a wing structure, a main nacelle mounted on said wing structure along the fore and aft center of the airplane, an empennage supporting outrigger structure extending rearwardly from said wing structure, and a supplemental nacelle mounted and supported from said outrigger structure to the rear of said main nacelle in substantially longitudinal alinement therewith.

16. In an airplane, an outrigger structure, an empennage mounted and supported thereon, a transversely disposed girder mounted across said outrigger structure, a longitudinal disposed girder mounted between said transverse girder and said empennage, and a nacelle mounted on and supported by said transverse and longitudinal girders.

17. In an airplane, a wing structure, a rearwardly extending outrigger structure, an empennage mounted at after end of said outrigger structure, and a nacelle mounted and supported on said outrigger structure between said wing structure and said empennage.

18. In an airplane, a wing structure, an outrigger extending rearwardly therefrom, an empennage mounted at the after end of said outrigger, and a control nacelle mounted intermediate said wing structure and said empennage, the said nacelle providing a control point adapted to be operatively connected with the wing structure and empennage control surfaces.

19. In an airplane, a wing structure, a main nacelle mounted centrally with respect thereto along the fore and aft center of the airplane, an outrigger structure extending rearwardly from said wing structure, and a supplemental nacelle mounted on said outrigger structure independently and to the rear of and in longitudinal alinement with said main nacelle, the said supplemental nacelle forming a substantially uninterrupted continuation of the streamline contour of said main nacelle.

20. In an airplane, a wing structure, a forward nacelle mounted centrally with respect thereto along the fore and aft center of the airplane, spaced outrigger girders extending rearwardly from said wing structure at opposite sides of said nacelle, and a supplemental nacelle supported between said spaced outrigger girders to the rear of and in longitudinal alinement with said forward nacelle, the said supplemental nacelle mounted to form a substantially uninterrupted continuation of the streamline contour of said forward nacelle.

21. In an airplane, a wing structure, a forward nacelle mounted at said wing structure, an outrigger structure including spaced members extending rearwardly from said wing structure at opposite sides of said forward nacelle, and a supplemental nacelle mounted between said outrigger members in substantially longitudinal alinement with and carrying out the contour of said forward nacelle, said supplemental nacelle protected at the forward end by said main nacelle and at the sides by the spaced members of said outrigger structure.

22. In an airplane, a wing structure, a forward nacelle mounted at said wing structure, an outrigger structure including spaced members extending from said wing structure, an empennage mounted at the extended end of said outrigger structure, a transverse girder mounted across and extending between said spaced outrigger members adjacent said wing structure, a longitudinal girder extending from said transverse girder to said empennage, and a supplemental nacelle mounted and supported on said transverse and longitudinal girders in longitudinal alinement with and forming a substantially unbroken continuation of the contour of said forward nacelle.

23. In an airplane, a wing structure, a forward nacelle mounted at said wing structure, a pusher propeller mounted at the after end of said nacelle, an outrigger structure including spaced members extending rearwardly from said wing structure at opposite sides of said forward nacelle, and a supplemental nacelle mounted between said spaced outrigger members independently of and in longitudinal alinement with said forward nacelle and forming a substantially uninterrupted continuation of the contour of said forward nacelle.

24. In an airplane, a main nacelle, a pusher propeller mounted at one end thereof and a tractor propeller mounted at the opposite end thereof, and a supplemental nacelle mounted to the rear and independently of said main nacelle in longitudinal alinement therewith and forming a substantially uninterrupted continuation of the contour thereof.

25. In an airplane, a main nacelle mounted along the fore and aft center of the airplane, a pusher propeller mounted at one end and a tractor propeller mounted at the opposite end of said nacelle, and a supplemental nacelle mounted to the rear of said main nacelle in longitudinal alinement with and forming a substantially uninterrupted continuation of the contour thereof.

26. In an airplane, a main nacelle mounted along the fore and aft center of the airplane, a pusher propeller mounted at the after end and a tractor propeller mounted at the forward end of said main nacelle, and a supplemental nacelle mounted to the rear and supportedly independently of said main nacelle in longitudinal alinement with and forming a substantially uninterrupted continuation of said main nacelle, with said pusher propeller mounted and having working clearance between said alined nacelles.

27. In an airplane, a main nacelle, a pusher propeller mounted at the after end of said nacelle and a tractor propeller mounted at the forward end thereof, a power plant mounted in said nacelle for driving said propellers, and a pilot's nacelle mounted to the rear of said main nacelle in substantially longitudinal alinement therewith and forming a substantially uninterrupted continuation of the contour thereof, the said pilot's nacelle so mounted provided with a cockpit from which the air plane is controlled.

28. In an airplane, alined forward and rear units forming a body of substantially streamline contour, said forward unit provided with a tractor propeller and motor at the forward end thereof, and a pusher propeller and motor at the rear end thereof, said pusher propeller located and operating between said forward and rear body units, and the said rear body unit provided with a pilot's cockpit from which the airplane is controlled.

29. In an airplane, an outrigger structure including spaced rearwardly extending girders, an empennage including a main horizontal stabilizer and spaced vertical fins mounted thereon, said empennage mounted and supported at the end of said outrigger structure by attaching said horizontal stabilizer across and closing the ends of said girders, and an adjustable horizontal stabilizer mounted between and attached to said vertical fins above said main horizontal stabilizer.

30. In an airplane, an outrigger structure including spaced girders, and an empennage including a main horizontal stabilizer mounted at the outer end of said outrigger structure with said horizontal stabilizer extending across and covering the ends of the spaced outrigger girders.

31. In an airplane, a forward nacelle, a rear nacelle supported independently of and in longitudinal alinement with said forward nacelle, and a removable section between and faired with said forward and rear nacelles.

Signed at Ithaca, New York, this 10th day of November, 1922.

RANDOLPH F. HALL.